United States Patent
Lee et al.

(10) Patent No.: US 9,964,718 B2
(45) Date of Patent: May 8, 2018

(54) OPTICAL MODULE INCLUDING OPTICAL BLOCK FOR PASSIVE OPTICAL ALIGNMENT, AND MANUFACTURING METHOD THEREOF

(71) Applicant: LS MTRON LTD., Anyang-si, Gyeonggi-do (KR)

(72) Inventors: Seung Hun Lee, Seoul (KR); Young Ho Kim, Seoul (KR); Kyung Nyung Woo, Seoul (KR); Ick Kyun Lee, Gunpo-si (KR); Keon Cheol Park, Gunpo-si (KR)

(73) Assignee: LS MTRON LTD., Anyang-si, Gyeonggi-Do (KR)

( * ) Notice: Subject to any disclaimer, the term of this patent is extended or adjusted under 35 U.S.C. 154(b) by 0 days. days.

(21) Appl. No.: 14/895,623

(22) PCT Filed: Jul. 7, 2014

(86) PCT No.: PCT/KR2014/006067
§ 371 (c)(1),
(2) Date: Dec. 3, 2015

(87) PCT Pub. No.: WO2015/002520
PCT Pub. Date: Jan. 8, 2015

(65) Prior Publication Data
US 2016/0216463 A1    Jul. 28, 2016

(30) Foreign Application Priority Data

Jul. 5, 2013  (KR) .......................... 10-2013-0079139
Jul. 5, 2014  (KR) .......................... 10-2014-0084109

(51) Int. Cl.
G02B 6/32  (2006.01)
G02B 6/42  (2006.01)
G02B 6/43  (2006.01)

(52) U.S. Cl.
CPC ............... G02B 6/424 (2013.01); G02B 6/32 (2013.01); G02B 6/423 (2013.01); G02B 6/4221 (2013.01);
(Continued)

(58) Field of Classification Search
CPC .................................................. G02B 6/4221
See application file for complete search history.

(56) References Cited

U.S. PATENT DOCUMENTS 5,434,939 A    7/1995  Matsuda
6,188,118 B1   2/2001  Severn
(Continued)

FOREIGN PATENT DOCUMENTS

CN    101441298 A    5/2009
JP    2000-515687 A  11/2000
(Continued)

OTHER PUBLICATIONS

Search Report for International Application No. PCT/KR2014/006067.
(Continued)

*Primary Examiner* — Chris Chu
(74) *Attorney, Agent, or Firm* — K&L Gates LLP

(57) ABSTRACT

An optical module includes optical transmission member, optical element, substrate, electrode pad between the optical element and external circuit, and optical block including optical transmission member mounting portion. The optical transmission member mounting portion is formed on the optical block in optical axis direction such that optical transmission efficiency is the maximum. A manufacturing method of the optical module includes mounting and electrically connecting the optical element on one face of the substrate, calculating a position on a 2-dimensional plane of optical input/output point of the optical element, forming
(Continued)

base material of the optical block to impregnate the optical element onto the substrate, forming the optical transmission member mounting portion at the position on the 3-dimensional plane of the optical input/output point calculated in the former step on the base material, and mounting the optical transmission member on the optical transmission member mounting portion.

11 Claims, 7 Drawing Sheets

(52) U.S. Cl.
CPC ......... *G02B 6/4227* (2013.01); *G02B 6/4242* (2013.01); *G02B 6/4255* (2013.01); *G02B 6/4257* (2013.01); *G02B 6/4274* (2013.01); *G02B 6/4204* (2013.01); *G02B 6/43* (2013.01)

(56) References Cited

U.S. PATENT DOCUMENTS 7,476,041 B2   1/2009   Kopp et al.

| | | |
|---|---|---|
| 2002/0054737 A1 | 5/2002 | Jian |
| 2003/0001115 A1 | 1/2003 | Marion |
| 2004/0085609 A1* | 5/2004 | Fries ............... G02B 6/4204 359/242 |
| 2005/0112884 A1 | 5/2005 | Gormley |
| 2009/0127577 A1* | 5/2009 | Hodono ............ G02B 6/4204 257/98 |

FOREIGN PATENT DOCUMENTS

| | | |
|---|---|---|
| JP | 2009-507253 A | 2/2009 |
| JP | 2010-266729 A | 11/2010 |
| KR | 10-2009-0052286 A | 5/2009 |

OTHER PUBLICATIONS

European Search Report for International Application No. PCT/KR2014006067.

KIPO Office Action for Korean Application No. 10-2014-0084109 which corresponds to the above-referenced U.S. application.

* cited by examiner (a)

(b)

(c)

OPTICAL MODULE INCLUDING OPTICAL BLOCK FOR PASSIVE OPTICAL ALIGNMENT, AND MANUFACTURING METHOD THEREOF

TECHNICAL FIELD

The present, invention relates to an optical module which is modularized including an optical element and an optical transmission member for mass data high-speed transmission of a board in a device and mass data high-speed transmission between devices, and in which optical alignment is completed between the optical element and the optical transmission member in the module, thereby removing an optical alignment error occurring when mounting it on an external PCB substrate and, more specifically, to an optical module including an optical block capable of embodying passive optical alignment by processing an optical transmission member mounting, portion at a measured optical element mounting position, and a manufacturing method thereof.

BACKGROUND ART

Recently, a high-speed transmission technique of mass data such as high-quality 3D image contents in a device or between devices has emerged, and signal attenuation, noise, EMI/EMC, impedance matching, cross talk, skew, connection wire miniaturization, and the like have been issued.

Generally, in data transmission in a device or between devices, that is, an electric lead based on a copper wire has been used in a device, and a cable using it has been used between devices, but the copper wire cannot satisfy a high-speed transmission need, and does not dissolve various technical issues mentioned above.

As a technique to solve this problem, recently, an optical connection technique has been studied and developed. An optical module can achieve mass data high-speed transmission because parallel electrical signal lines of several ten channels are replaced by a serial optical signal line, and can solve the technical problems such as noise, EMI/EMC, impedance matching, cross talk, skew, and connection wire miniaturization.

In order to apply optical transmission and optical connection devices using optical materials to various use environments, various kinds of products such as optical connectors and optical modules have been developed. They basically provide a connecting function of connecting two or more light pathways separated from each other, and additionally provide a function of forming and changing an optical signal transmission path using optical phenomena such as refraction, reflection, interference, and diffraction, and amplifying or merging an optical signal. An optical element that has such a configuration has a function of connecting two different areas (optical area and electrical area), or provides design for securing optimal transmission efficiency while performing a role of connecting an optical area and an optical area. The problem is errors included in an optical connector system and the like. For example, since a device (die bonder or the like) for mounting an optical element on a substrate necessarily includes an error, a final mounting position of the optical element is indefinite and, even in the case of an optical transmission member, a center of a core is eccentric, that is, an error of a manufacturing area occurs.

In order to solve the problem mentioned above, a process of active optical alignment has emerged. The active optical alignment means a series of processes of searching and finding a point or a state representing optimal optical transmission efficiency in optimal disposition or arrangement of constituent elements for optical signal transmission such as optical elements, and fixing to maintain such a point or state. However, since the active optical alignment requires much time in an operation process and is unsuitable for mass production, recently, structural elements, are designed and disposed in a connector to contrive optical alignment, or a passive optical alignment manner to directly dispose positions of optical elements on a light pathway tends to be spread.

In addition, according to miniaturization of electronic devices, there is an issue of miniaturization and low disposition even in optical devices such as optical connectors used therein, and it is important to optimize the existing layout or to devise a new layout in elements in a device to satisfy such requirements.

An optical module (hereinafter, referred to as 'Prior Art 1') illustrated in FIG. 1 includes a transmission unit 10a, a reception unit 10b, and an optical transmission path 2 which is a connection wire between the transmission unit and the reception unit. The transmission unit includes a VCSEL chip 3a on a substrate 6a, an electrode pad 5a, a bonding wire 7a, a liquid resin 8a, and a height support member 4a, and the reception unit includes a PD chip 3b on a substrate 6b, an electrode pad 5b, a bonding wire 7b, a liquid resin 8b, and a height support member 4b.

In an operation of the optical module illustrated in FIG. 1, an electrical signal from a board connected to the transmission unit is converted into an optical signal in the VCSEL chip 3a and is vertically output by a control of a driver IC (not illustrated) through the electrode pad 5a on the substrate 6a, and the optical signal is reflected by a 45° mirror face formed at an end of the optical transmission path 2 to change a route, and then is transmitted to the reception unit through the optical transmission path 2.

In the reception unit, the optical signal is reflected by a 45° mirror face formed at an end of the optical transmission path 2 to change a route, is input to the PD chip 3b on the substrate 6b, and then is converted into an electrical signal in a PD chip 3b through a control of an IC (not illustrated) through the electrode pad 5b on the substrate 6b, and the electrical signal is input to the board connected to the reception unit.

A photoelectric complex connector illustrated in FIG. 2 is disclosed in Japanese Laid-Open Patent No. 2010-266729 (Title of Invention: "Photoelectric complex connector", hereinafter, referred to as 'Prior Art 2'), which is described as follows. Prior Art 2 illustrated in FIG. 2 is configured by a plug 20 coupled to a connector 30 called a receptacle mounted on a board in a device, and the plug 20 includes a housing 21, an electrical terminal 22 and a ground terminal 23 which are mounted on both sides of the housing 21, a ground plate 24 which is mounted on a bottom face in the housing 21, a VCSEL chip 26 on a sub-mount 25 mounted on the ground plate 24, a driver IC 27, a bonding wire 28 which has a connection wiring function among the electrical terminal 22, the ground, terminal 23, the VCSEL chip 26, and the driver IC 27, and an optical fiber 29 which is inserted into the housing 21.

Prior Art 3 illustrated in FIG. 3 provides an optical connector including a PCB substrate 50 on which an optical element 40 is mounted, an optical sub-assembly (OSA) 70 which accommodates an optical transmission member 80, includes a 45° optical reflection face having a function of vertically changing a direction of an optical signal and a lens unit which integrates an optical signal, and is made of an optical transparent material, a guide member 90 which fixes the optical transmission member to the OSA, and an optical alignment member 60 which is placed on the PCB substrate and has a structure for optical alignment of transmitting the optical signal from the optical transmission member to the optical element at high transmission efficiency or transmitting the optical signal from the optical element to the optical transmission member at high efficiency, and particularly, the optical alignment is performed by coupling of an alignment protrusion 71 and an alignment groove portion 61 formed in the optical alignment member 60 and the OSA 70, respectively.

SUMMARY OF INVENTION

Technical Problem

In Prior Art 1, for 90° change of the optical path, an additional process of cutting such that the end face of the optical transmission member forms 45° with respect, to an axial direction is necessary, and also an active optical alignment process should be necessarily included to correct an equipment error necessarily existing in a die bonder used to mount an optical element on a circuit board. The optical alignment process in Prior Art 1 includes operating a driving circuit of an optical element, then measuring transmission efficiency using a measurement device such as an optical spectrum analyzer with respect to a generated optical signal, searching a state in a state where the transmission efficiency satisfies a predetermined condition, and sequentially fixing an optical element and an optical transmission member at a position in the state. However, when passing through such active optical alignment, optical transmission efficiency with a predetermined level or higher is secured, but since it is basically based on a trial and error method, there is a problem of relatively long time and high costs.

Meanwhile, in Prior Art 2, a driver IC 27 on, a ground plate 24 should be electrically connected to an electrical terminal 22 on a side of a housing 21 by a bonding process, it is difficult to embody a bonding wire 28 on a plug 20 with a size of miniaturization and low disposition, and particularly, when the number of pins of the electrical terminal 22 gets larger, a wire bonding process is difficult. In addition, in Prior Art 2, since all elements and components have to be mounted in the housing 21 of the plug 20, the process difficulty is high, and since the deriver IC 27 having a relatively large size is positioned on the plug side, there is, a problem that miniaturization of the plug may be difficult.

In addition, in Prior Art 2, in a state where a VCSEL chip 26 is placed on a sub-mount 25 manufactured by a wafer and is mounted on a ground plate 24, an optical fiber 29 is placed on the ground plate 24, optical alignment is performed with the VCSEL chip 26, the VCSEL chip 26 and the optical fiber 29 are not relatively fixed, and thus there is a problem that the optical alignment is not properly performed. In addition, when the plug 20 is coupled (plugged) to the receptacle 30 or is detached (separated) from the receptacle 30, there is no handle on the plug, and thus there is a problem that an operation is difficult.

In Prior Art 3, as an error considerable concerning optical alignment, errors generated between a PCB substrate 50 and an optical alignment member 80, between the optical alignment member 60 and an OSA 70, and between the optical transmission member 80 and the OSA 70 are accumulated. Specifically for each error, in placement of the optical alignment member 60 on the PCB substrate 50, an error occurring when the optical element 40 is not aligned on a connection line of a cross-sectional center of an alignment groove portion 61 of the optical alignment member, an error occurring by a processing error and an assembly error of the alignment groove portion 61 of the optical alignment member and the alignment protrusion 71 of the OSA, and an error occurring since the optical transmission member 80 is not mounted at a determined position of the OSA 70, are accumulated. Not only that, but even in the die bonding process of the optical element, even when the optical element is not mounted at a determined position due to an equipment error, optical transmission efficiency is reduced, and the overall errors may be larger than those at the time of designing since external error factors which is not included in the constituent elements of the invention of Prior Art 3 are accumulated and generated together. In other words, in order to secure optical alignment, all such errors have to be simultaneously managed, and there is high probability that the overall optical transmission efficiency is to be low. In addition, since a large number of components are used to provide a structure necessary to secure optical alignment and to stably mount, a cost problem and a manufacturing complex problem are disadvantageous, and there is no probability that the configuration of Prior Art 3 is to directly applied to another application due to a configuration in which the optical element is directly mounted on the PCB substrate (non-modularization).

Solution to Problem

According to the invention proposed to solve the problems described above and to meet the requirements described above, there is provided an optical module including: an optical transmission member 100 for transmitting an optical signal, an optical element, a substrate 210, an electrode pad 220, and an optical block 300 which includes an optical transmission member mounting portion 310 formed for optical alignment between the optical element 200 and the optical transmission member 100, wherein the optical transmission member mounting portion is formed at an optimal position where optical transmission efficiency is the maximum on the optical block vertically to the substrate in an optical axis direction.

In addition, a shape of the optical transmission member mounting portion 310 satisfies a condition in which a depth is equal to or larger than a width with respect to an aspect ratio of depth to width.

In addition, there is provided a manufacturing method of the optical module that includes mounting and electrically connecting the optical element 200 onto one face of the substrate 210, calculating a position on a 2-dimensional plane of an optical input/output point of the optical element 200, then forming a base material of the optical block 300 to, impregnate the optical element 200 onto the substrate 210, thereafter, forming the optical transmission member mounting portion 310 at the position on the 3-dimensional plane of the optical input/output point calculated in the former step on the base material, and mounting the optical transmission member 100 on the optical transmission member mounting portion 310.

Advantageous Effects of Invention

The invention has a first effect of using passive optical alignment without active optical alignment having much time and complex steps, a second effect of having overall improvement by absorbing a processing error of a processing device such as a die bonder, and a third effect having an advantage of modularization by applying or expanding the optical module of the invention as a kind of element to various other systems.

Concerning the first effect, there is proposed a configuration of securing an optical alignment effect only by mounting the optical transmission member 100 on the optical transmission, member mounting portion 310 through a configuration of aligning a center position of an end of the optical transmission member mounting portion 310 to an optical input/output point of the optical element 200.

Concerning the second effect, it is not to accept an equipment error of a chip bonding or die bonder device generally having a several ten micrometer order or to minimize it, a final mounting position of the optical element 200 which is actually mounted by reflecting these errors, and it is possible to raise optical transmission efficiency and to reduce an optical alignment defect rate caused by a processing error through a process of aligning the optical transmission member 100 at the position. In other words, an error of a processing device is initially included to remove an influence thereof.

Concerning the third effect, the optical module of the invention is modularized by employing the minimum number of components such as the optical element 200, the optical block 300, and the optical transmission member 100, particularly, optical alignment that is a key quality factor in optical components is independently settled in the optical module according to the invention, thus when the optical module according to the invention is used in another application (for example, an electronic device such as a mobile phone), an issue of optical alignment does not occur any more between the application and the optical module according to the invention, and it serves as a so-called 'element' for optical alignment. Since a separate structure for optical alignment or an alignment key becomes unnecessary in the application, a loss of an optical signal is reduced in terms of an overall system including the optical module, it is possible to satisfy an issue of low disposition and miniaturization of the application, it is, not necessary to manually align optical components in a main process of the application, and thus it is possible to reduce a process time and process costs. Furthermore, since the optical element is not mounted on the substrate of the application and is included in the invention by modularization and a pattern design on the application side is relatively simple, the optical module according to the invention may be used as various aspects, such as being directly mounted on a PCB substrate or coupled to a slot in various external devices needing photoelectric conversion.

BRIEF DESCRIPTION OF DRAWING(S)

Figure 9:
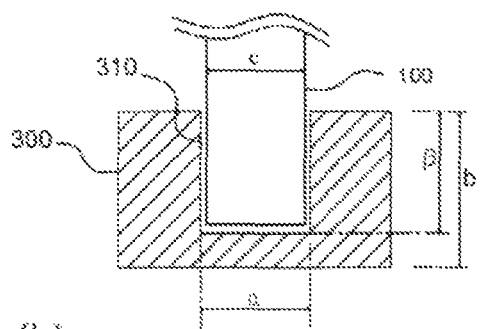
Figure 9:
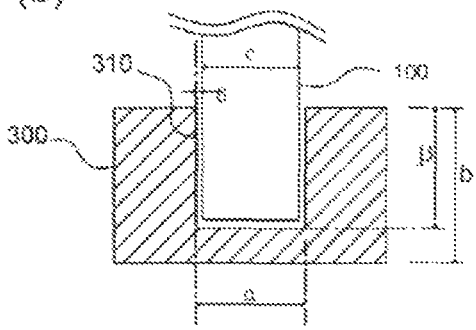
Figure 9:
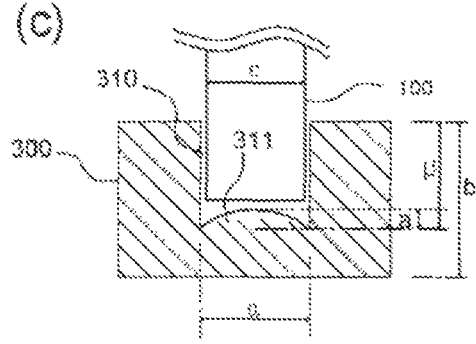

FIG. 9 is, a diagram illustrating specifications of an optical transmission member mounting portion 310 and parameters for mounting an optical transmission member 100. Specifically, FIG. 9(*a*) illustrates an aspect ratio of an optical transmission member mounting portion, FIG. 9(*b*) illustrates a clearance (gap) between an optical transmission member mounting portion and an optical transmission member, and FIG. 9(*c*) illustrates that an optical transparent portion having a convex lens shape is formed on an optical transmission member mounting portion.

Figure 10:
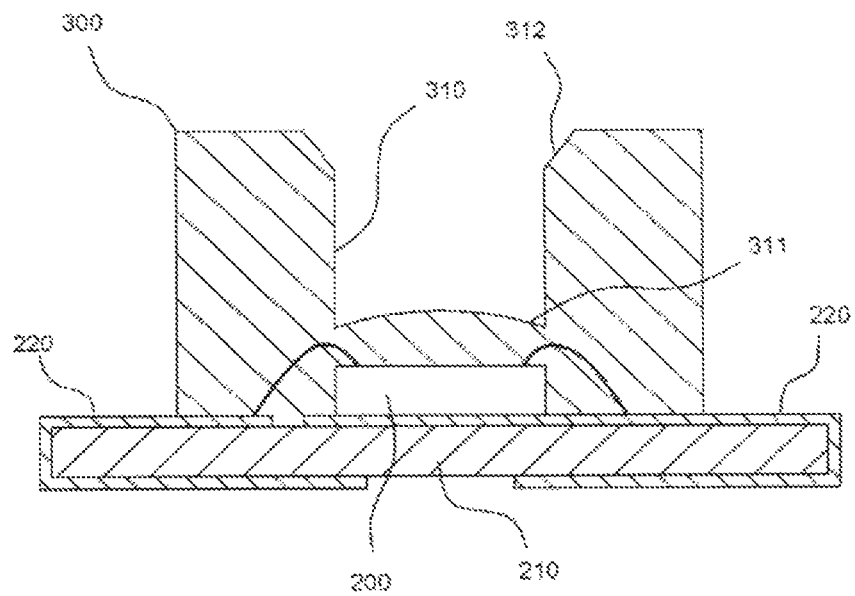

FIG. 10 is a cross-sectional view illustrating a relative position of an optical block 300, an optical element 200, and the like according to an embodiment of the invention.

Figure 11:
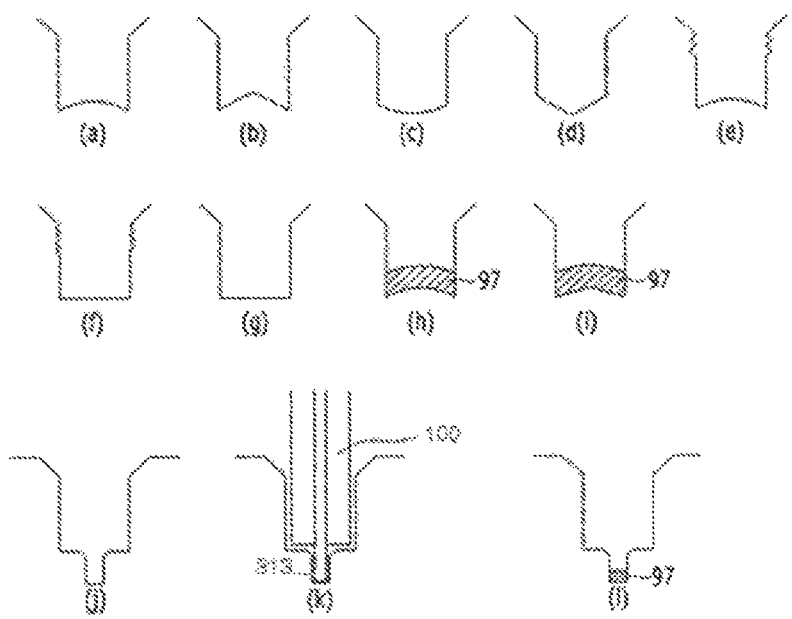

FIG. 11 is a diagram illustrating a shape of an optical transparent portion 311 and a core additional insertion portion 313 according to an embodiment of the invention.

Figure 12:
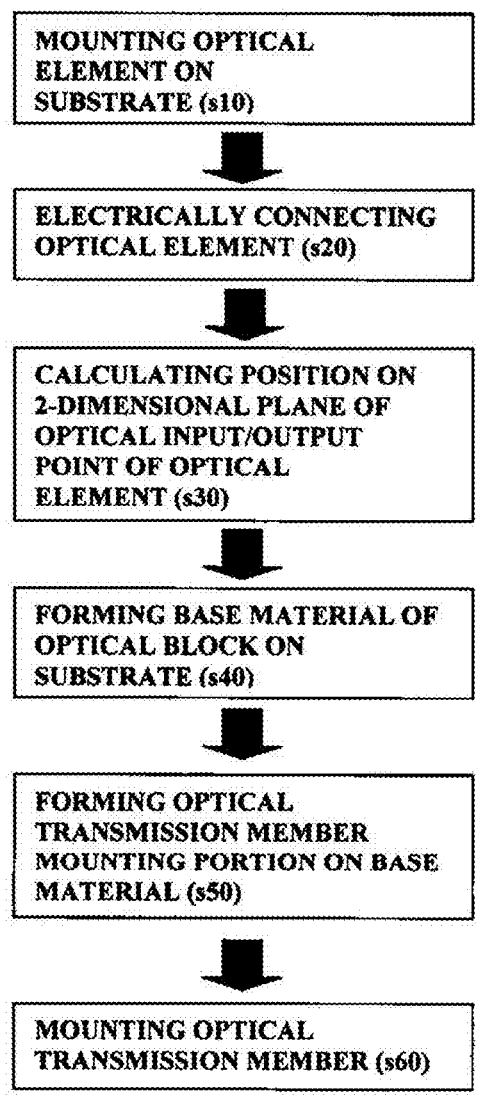

FIG. 12 is a flowchart illustrating sequence of steps of a manufacturing method of an optical module according to the invention.

DESCRIPTION OF EMBODIMENTS

An embodiment of an optical block for securing mounting performance and mounting reliability will be described.

Embodiment 1

In an embodiment of an optical block illustrated in FIG. 9(*a*), it is to secure mounting performance and mounting reliability through setting a depth and a width of an optical transmission member mounting portion 310. Considering that a general diameter of an optical transmission member 100 is several hundred micrometers, it is not necessary to form the depth of the optical transmission member mounting portion 310 too deeply, but the depth has to be determined to be sufficiently fixed to the extent so as not to be detached after mounting the optical transmission member 100. In the embodiment, in order to improve mounting reliability of the optical transmission member 100 in a practical environment, a concept of an aspect ratio that is a ratio of depth to width of the optical transmission member mounting portion 310 is introduced, and it is proposed that the optical transmission member mounting portion 310 is formed such that a depth thereof is equal to or larger than a width. In other words, the condition in FIG. 9(*a*) is $\beta \geq \alpha$ in the width ($\alpha$) and the depth ($\beta$) of the optical transmission member mounting portion 310. Under the satisfaction of such a condition, the sum of static friction acting between the optical transmission member 100 and the optical transmission member mounting portion 310 acts larger than external removal force of the optical transmission member 100 such as vibration in the general practical environment, and thus reliability of mounting may be secured. Meanwhile, concerning the aspect ratio of the optical transmission member mounting portion, when the depth is larger than the width, a contact area between the optical transmission member and the inner wall face of the transmission member mounting portion after mounting the optical transmission member is relatively smaller than that of the invention, this causes reduction of static friction that is unique holding force for maintaining the insertion state of the optical transmission member, and there is high probability that the optical transmission member is to be detached. In this case, since the mounting performance based on the static friction cannot be reliably secured, the meaning of an optical transmission member mounting hole is decreased, and the optical transmission member mounting hole has only a function of presenting the optical transmission member mounting position. Therefore, in this case, in order to secure the mounting reliability, essentially an adhesive is applied on the inner wall face of the optical transmission member mounting portion to fix the optical transmission member or, in this case, the adhesive flow, thus the core of the optical transmission member or the optical transparent portion of the optical block is provided with a separate structure for fixing the optical transmission member onto the optical block, for example, a lib structure, or a separate structure so as not to be detached by pulling the optical transmission member vertically downward s necessary. Meanwhile, in the invention, it is not necessary to provide such an adhesive or a separate configuration, it is possible to secure mounting reliability of the optical transmission member through careful management of a fit tolerance to be described later together with a shape (depth is larger than width) of the optical transmission member mounting portion. This also means that it is possible to reduce costs and process time necessary for the separate structure or the process of applying the adhesive. However, when the depth of the optical transmission member mounting portion 310 becomes larger than necessary, the height b of the optical block 300 gets larger, and as a result, it is considered that there is a disadvantage of low disposition of the optical module.

The width of the optical transmission member mounting portion 310 is a value of a in the embodiment illustrated in FIG. 9(a), which is related to a diameter value c of the optical transmission member. In other words, even when the condition of the aspect ratio is satisfied in the shape of the optical transmission member mounting portion 310 and when the diameter of the optical transmission member 100 is significantly smaller than the width of the optical transmission member mounting portion 310, that is, $c<<\alpha$, a problem of easy detachment occurs. In addition, when the diameter of the optical transmission member 100 is significantly larger than the width of the optical transmission member mounting portion 310, that is, $\alpha<<c$, the mounting of the optical transmission member 100 may become impossible. Accordingly, in the invention, application of a loose fit tolerance or a interference fit tolerance between the optical transmission member 100 and the optical transmission member mounting portion 310 is excluded, it is proposed to manage by applying a transition fit tolerance. When there is a clearance, it is possible to additionally consider mounting by applying an adhesive made of epoxy resin or the like to an insertion portion of the optical transmission member to further secure detachment prevention. Separately, when a cover of the optical transmission member is made of a material having elasticity, and even when there is no clearance between the optical transmission member and the optical transmission member mounting portion, it is considered that the cover is compressed in the course of fitting and the mounting may be possible. However, in order to compress the cover, it is more preferable that an unevenness structure is provided on an inner face of the optical transmission member mounting portion or the cover of the optical transmission member has a structure capable of forming wrinkles.

Embodiment 2

In an embodiment of an optical block illustrated in FIG. 9(b), the other configuration is the same as compared with Embodiment 1, but it is to secure mounting performance and mounting reliability by setting a relation between a clearance (value of S in FIG. 9(b)) between the optical transmission member and the optical transmission member mounting portion and a depth (value of β in FIG. 9(b)) of the optical transmission member mounting portion. When there is a clearance between the optical transmission member and the optical transmission member mounting portion as described above, it is clear that it is possible to secure the mounting reliability of the optical transmission member when the depth of the optical transmission member mounting portion is significantly larger than the size of such a clearance, and this is represented by an equation using values illustrated in FIG. 9(b), as $\beta>>\delta$.

Embodiment 3

In an embodiment of an optical block illustrated in FIG. 9(c) the other configuration is the same as compared with Embodiment 1, but when an optical transparent portion 311 (details related thereto will be described later) is formed on a bottom face of the optical transmission member mounting portion, there is provided a configuration for improving mounting performance and mounting reliability of the optical transmission member. When the optical transparent portion having a convex lens shape is formed, a side face contact area between the optical transmission member and the optical transmission member mounting portion is reduced at the time of mounting the optical transmission member due to a thickness (value of a in FIG. 9(c)) at the highest point of the shape of the optical transparent portion, as a result, static friction acting between the members is reduced, and probability that the optical transmission member is to be detached by external force gets higher. Accordingly, in such a case, it is preferable to set an aspect ratio of the optical transmission member mounting portion to satisfy the condition of $\beta \geq \alpha+a$. In this case, in spite of the existing of the optical transparent portion, the insertion depth of the optical transmission member to the optical transmission member mounting portion is secured as much as at least α, thereby maintaining the mounting reliability.

An optical module according to the invention includes, as main constituent elements, an optical transmission member 100 for transmitting an optical signal, an optical element 200 for photoelectric conversion, a substrate 210 on which the optical element 200 is mounted, an electrode pad 220 for electrical connection between the optical element 200 and an external circuit, and an optical block 300 which includes an optical transmission member mounting portion 310 formed for optical alignment between the optical element 200 and the optical transmission member.

In terms of an optical signal and an electrical signal, when the optical module of the invention is used in a transmission unit, the mounted optical element 200 is a laser diode or a VCSEL, and an optical signal output from the optical element 200 controlled from an external driving circuit enters a core unit of the optical transmission member 100 and is transmitted. In addition, when the optical module is used in a reception unit, the mounted optical element 200 is a photo diode, and an optical signal transmitted from the optical transmission member 100 is input to an optical input face of the optical element 200, and then is converted into an electrical signal by a photoelectric conversion action of the optical element 200, and the electrical signal is transmitted to an external circuit through the electrode pad 220.

Concerning optical alignment security, a so-called butt coupling manner in which the optical signals transmitted by the optical input/output face of the optical element 200 and the optical transmission member 100 according to the invention are vertical to each other is employed and embodied. When the optical element 200 and the optical transmission member are connected in such a manner, there is an advantage that the optical signals input and output from the optical transmission member and the optical element 200 can be immediately transmitted to each other, but the optical input/output face of the optical element 100 mounted on an upper face of a horizontal substrate is relatively vertical to a traveling direction of the optical signal, thus a separate structure for fixing the optical transmission member is necessary, and the optical block 300 takes charge of such a function in the invention.

In the case of butt coupling, a condition of ideal complete optical alignment can be embodied by minimizing a distance between the optical input/output point of the optical element 200 and the center of the exposed core cross section of the optical transmission member while the optical input/output point is matched with the center of the core cross section as accurately as possible. However, considering a position error among constituent elements constituting the optical connector and a manufacturing error included in the constituent elements, such a complete optical alignment is impossible. Accordingly, for optical alignment in a practically available level, the following two optical alignment methods are conceivable.

First, there is a first optical alignment method of searching a point at which optical transmission efficiency is maximum while changing a relative positions of the optical transmission member 100 and the optical element 200, and fixing the relative positions of the optical transmission member 100 and the optical element 200 to the positions at the time point when the optical transmission efficiency is maximum and, second, there is a second optical alignment method of preparing a platform portion that is a member playing a role of a platform on which the optical transmission member 100 is mounted, optically aligning the platform portion and the optical element 200 in advance before mounting the optical transmission member, to secure optical alignment only by mounting the optical transmission member on the platform portion without a separate optical alignment process. The first optical alignment method is so-called active optical alignment, and the second optical alignment method is so-called passive optical alignment. In the first optical alignment method, optical transmission efficiency measured using an optical measurement device is used, and reliability for optical alignment is high, meanwhile, mounting positions of constituent elements of an optical transmission system have to be sequentially aligned, and fixed through several steps, thus a process is complex, and overall process time is long. In the second optical alignment method, the position of the center axis of the optical transmission member mounting portion 310 existing on the platform portion is allowed to fall within a predetermined error range with respect to the optical input/output point of the optical element 200. When the mounting of the optical transmission member 100 is completed using such a platform portion, a separate active optical alignment operation is not necessary, an overall processing speed and manufacturing costs can be reduced, and the invention proposes a configuration for such passive optical alignment.

Hereinafter, constituent elements of the invention will, be described, in detail.

As described above, the optical element 200 may be a VCSEL, a laser diode (LD), and a photo diode (PD) in the viewpoint in which the invention can be applied to both of a reception unit and a transmission unit of an optical signal. The optical transmission member 100 is the known optical fiber, and there is no limit in a diameter and a cross-sectional shape.

The substrate 210 on which the optical element 200 is mounted plays a role of supporting the optical block 300, and may be a PCB, a flexible PCB (FPCB), or the like.

Figure 1:
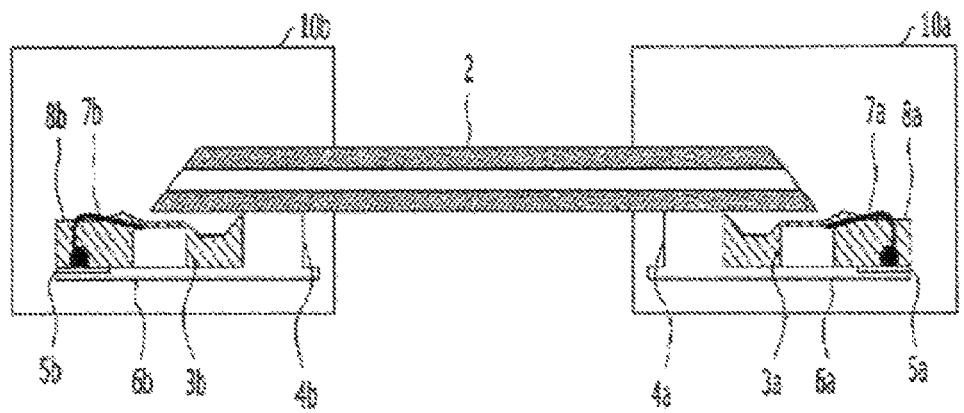
FIG. 1 is a diagram illustrating that an optical transmission member 100 is processed by 45° to form an optical waveguide according to Prior Art 1.
Figure 2:
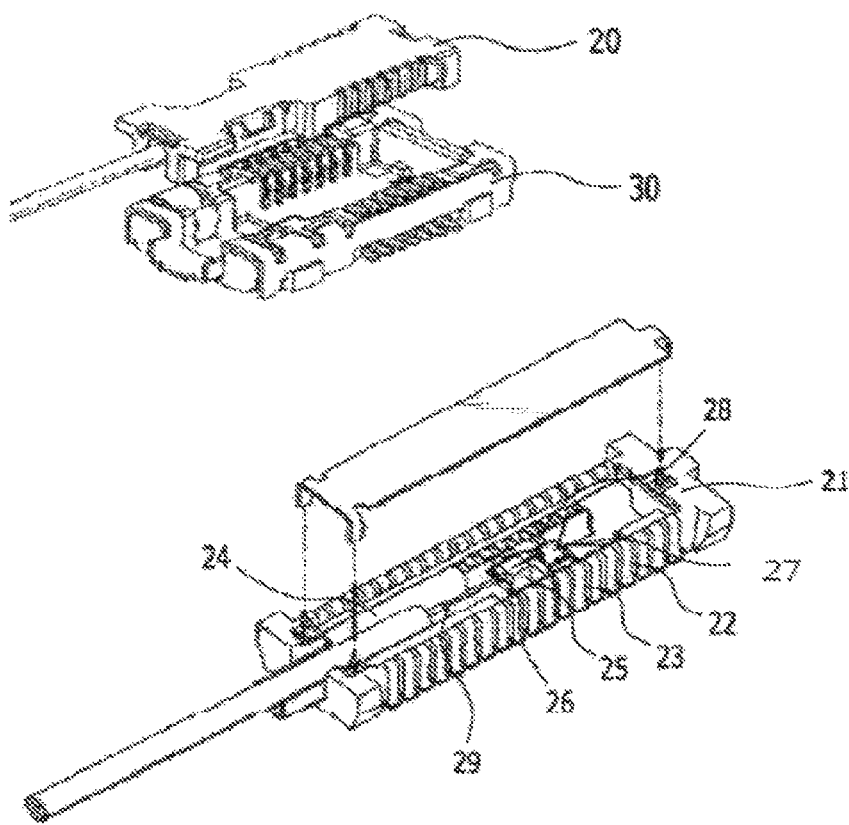
FIG. 2 is a diagram illustrating an optical module including a plug and a receptacle according to Prior Art 2.
Figure 3:
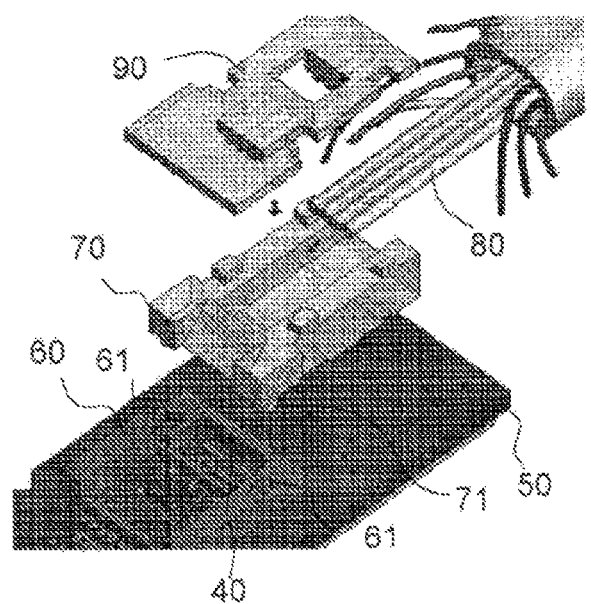
FIG. 3 is a perspective view illustrating a configuration (non-modularization) for optical alignment between an optical element and an optical transmission member according to Prior Art 3.
Figure 4:
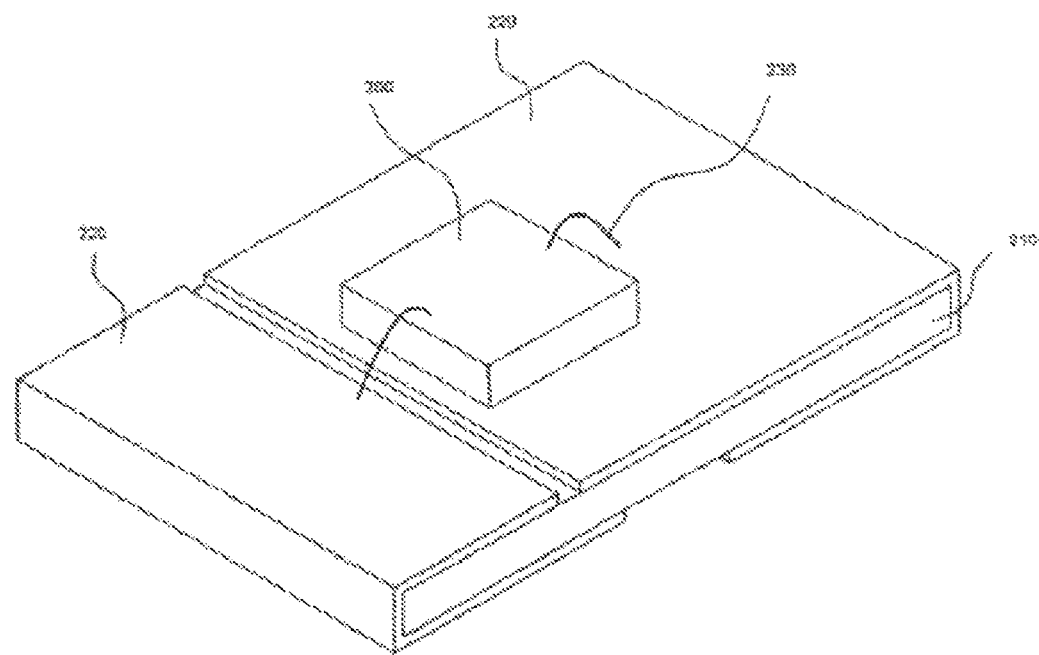
FIG. 4 is a perspective view illustrating that an optical element 200 is mounted on a substrate 210 according to an embodiment of the invention.

The electrode pad 220 play a medium role of transmission and reception of an electrical signal between the optical element 200 and the external circuit, and is formed on the substrate 210 described above to have a predetermined pattern. The electrode pads 200 have to be formed as much as the number of terminals of the optical element 200, in the embodiment illustrated in FIG. 4, the number of terminals of the optical element 200, and thus two electrode pads 220 are formed. The shape of the electrode pad may be set differently according to embodying situations, the electrode pad is formed to cover the entire face of the substrate 210 in the embodiment illustrated in FIG. 4 and is formed from the upper face of the substrate 210 to the lower face through the side face, the optical module according to the invention may be configured to be mounted on a separate circuit board through a reflow process or SMT of forming a bump on the lower face, but the electrode pad 220 is not necessarily limited to such a shape. The electrode pad 220 is preferably formed of conductive metal such as copper and silver, and may be formed in a form of a plating film having a thickness of several hundred micrometers. As an embodiment of forming the plating film, an electroforming process may be applied. The electroforming may be called electrolytic casting, a texture thereof is dense due to electro-deposition of metal caused by electricity and thus is very hard no matter how a thin thickness may be, and it is even lighter than a dimensional object made by casting and excellent in polishing, gloss, and the like. Even in the invention, a model is manufactured by reflecting the shape of the electrode pad with wax or the like, metal is electro-deposited on an outer face of the manufactured model by a phenomenon of electroplating, and then the model is removed, thereby manufacturing the purely metalized electrode pad. Alternatively, a manner of making a mold model and injecting a plating member into an empty space thereof to form a shape may be employed. Metal is suspended on a positive electrode (+), a model is suspended on the other negative electrode (−), electrolyte is put therein, electric current is allowed to, flow, a predetermined time is elapsed, and then metal with a predetermined thickness is uniformly attached.

The optical block 300 is a constituent element which performs a first function of forming an optical signal path by being formed to allow an optical signal to pass, a second function as a packaging member for protecting the optical element 200 and the like by being formed to impregnate them therein, a third function of mounting and fixing the optical transmission member 100, a fourth function of securing optical alignment by forming the optical transmission member mounting portion 310 at a predetermined position, and a fifth function of helping accurate transmission of an optical signal by having a shape of the separate optical transparent portion 311. Such an optical block may be configured by forming two or more parts and then coupling them, but it is more preferable to form a single part.

Concerning the first function, the optical block 300 through which an optical signal passes by a predetermined distance in a transparent member has to be made of a material with transmissivity of 70% to 100% with respect to a wavelength band of an optical signal used in optical transmission in manufacturing the transparent member. Such a material with high transmissivity may be preferably any one of silicon, epoxy, ABS, acrylic, polyolefin, and copolymer thereof. Particularly, silicon resin has a configuration based on silicon having a form of siloxane bond in which silicon and oxygen are alternate in a molecular structure, is thermoplastic or thermosetting resin in which a methyl group, a phenyl group, a hydroxy group, and the like are added to silicon, and excellent in electrical insulation, durability, and heat resistance. Particularly concerning heat resistance of such characteristics, there is little deformation, destruction, or decrease in optical transparency caused by heat even during the process based on a surface mount technology device (SMT), a reflow device, and the like in which the temperature is raised to about 300° C. In other words, it means that, later, in an environment in which the optical module of the invention is embodied, even in the course of mounting the optical module by a process such as SMT or even when the optical module is exposed to a reflow process to mount peripheral elements, there is little degradation of physical properties required for the optical block 300 of the optical module.

Concerning the second function, an encapsulant such as a solid encapsulant (EMC) or an underfill generally used in a packing process is a packing material for protecting a semiconductor chip from dust and impact to reduce an influence of an external environment, whereby it is possible to protect a connection portion of wire bonding or a soldering portion of an SMT process or flip chip bonding, and the transparent member of the invention is also manufactured by a material used as an encapsulant, and thus basically has such a function.

The third function is related to mounting performance and reliability and, in forming the optical transmission member mounting portion 310 formed in the optical block 300, coupling between the optical transmission member mounting portion and the optical transmission member has to be stably achieved, and further reliability capable of maintaining the mounting has to be secured even when time is elapsed.

The embodiment of the optical block for securing such mounting performance and mounting reliability has been described above.

Concerning the fourth function, as a method of selecting an optimal position for securing optical alignment, two embodiments are conceivable. One is a so-called vision feedback which is a method of taking an image of an optical element using an imaging device positioned above a mounting spot of the optical element, and determining, as the optimal position, a position of an optical signal input/output point of the optical element extracted from the taken image of the optical element, which will be described later.

The other embodiment is a method of determining the optimal position for forming the optical transmission member mounting portion by repeating a process of measuring optical transmission efficiency while changing a position on the substrate in a state where the optical transmission member is mounted on the optical block formed by molding or injection molding to have the optical transmission member mounting portion and searching a position where optical transmission efficiency equal to or higher than a value arbitrarily determined by an operator is secured. A so-called active optical alignment is performed before fixing the optical block on the substrate of the optical module, a schematic procedure of the active optical alignment is as follows. The optical module according to the invention is driven, optical transmission efficiency is calculated using a measurement device such as an optical spectrum analyzer, and the optical transmission efficiency is arbitrarily set according to a predetermined reference, that is, a use environment by an operator. For example, in order to search the time when the optical transmission efficiency is higher than 90%, this process is repeated. When the optical transmission efficiency is higher than the set reference, the optical block is fixed to the position at that time point and, as the fixing method, a laser welding method or a method of applying a UV adhesive or the like to the bottom face of the transparent member to attach the optical block is conceivable.

For reference, in the embodiments illustrated in FIG. 6 to FIG. 10, even in the cases of FIG. 6 to FIG. 8 and FIG. 10 in which it is not illustrated that the optical transmission member mounting portion and the optical element are optically and axially aligned as well as the case of FIG. 9 in which the optical element is not illustrated, first, in the case of performing the vision feedback process, the optical transmission member mounting portion is formed in a direction vertical to the substrate and is formed to be optically and axially aligned at the optical input/output point of the optical element, second, in the case of performing the method of molding or injection molding, the optical transmission member mounting portion of the optical block is formed in a direction vertical to the substrate, and is formed at the optimal position where the optical transmission efficiency determined through the searching process of the optical transmission efficiency described above, which is a premise.

The overall shape of the optical transmission member mounting portion 310 may be variously set, for example, wedge shapes (e) and (f) for generating greater friction on an inner wall face as in the embodiment illustrated in FIG. 11.

The optical transparent portion 311 proposed concerning the fifth function has a configuration for securing optical alignment without contact connection between the optical element input/output face and the optical input/output face of the optical transmission member 100 to each other. FIG. 11 illustrates an embodiment in which the optical transparent portion 11 formed on the bottom face of the optical transmission member mounting hole formed in the transparent member is formed in various shapes. A shape of a lens applied to the optical transparent portion 311 formed on the bottom face of the optical transmission member mounting portion 310 may be selected variously according to kinds, specifications, operation characteristics, and the like of the optical element 200. When the optical element is a VCSEL chip, a VCSEL acts as a point light source, an optical signal spreads from the input/output point, or the VCSEL chip is not mounted horizontally with respect to the substrate in the course of being mounted on the substrate by an SMT process or the like, the optical signal is not emitted vertically with respect to the substrate, or the center of the chip may be separated from a designated position due to an operation error of a device in a chip mounting process, and in such situations, the optical signal does not enter the inside of the core cross section of the optical transmission member, and thus loss of the optical signal may be caused. In order to remove such an optical signal loss, the output light has to be converted into parallel light and to reliably enter the core cross section of the optical transmission member, and this is embodied by processing to have a shape of a concave lens as viewing the optical transmission portion 311 toward the optical block 300 on the substrate side as illustrated in FIG. 11(c). In other words, such an optical transparent portion plays a role of a collimator, the optical signal travels in parallel to a depth direction of the optical transmission member mounting hole after passing through the optical transparent portion even when there is some deviation at the time of discharging, and thus it is possible to secure high signal transmission efficiency. In this case, considering that a focal length gets longer as a radius of curvature of the lens gets larger, the curvature of the lens shape has to be determined.

When the optical element is a PD chip, the optical transparent portion 311 may be processed in a convex lens shape as viewed from the optical block 300 toward the substrate as illustrated in FIG. 11(a) or FIG. 11(e) such that the optical signal transmitted from the optical transmission member is collected and is irradiated to an optical reception portion of the PD chip at high transmission efficiency. In other words, the optical signal is refracted on an interface of the optical transparent portion and is converged to the focus of the lens, and the efficiency of reaching the optical reception portion of the PD chip can be increased. Similarly to the case of the VCSEL, considering that the focal length gets longer as the radius of curvature of the lens gets larger, the curvature of the lens shape has to be determined, and a lens thickness (a in FIG. 9(c)) is appropriately set concerning it. In addition, in the ease of a flat face or a flat lens shape, it should, be understood that a separate lens shape is not formed on the bottom face of the optical transmission member mounting portion 310 in the process of forming the optical block 300.

Figure 7:
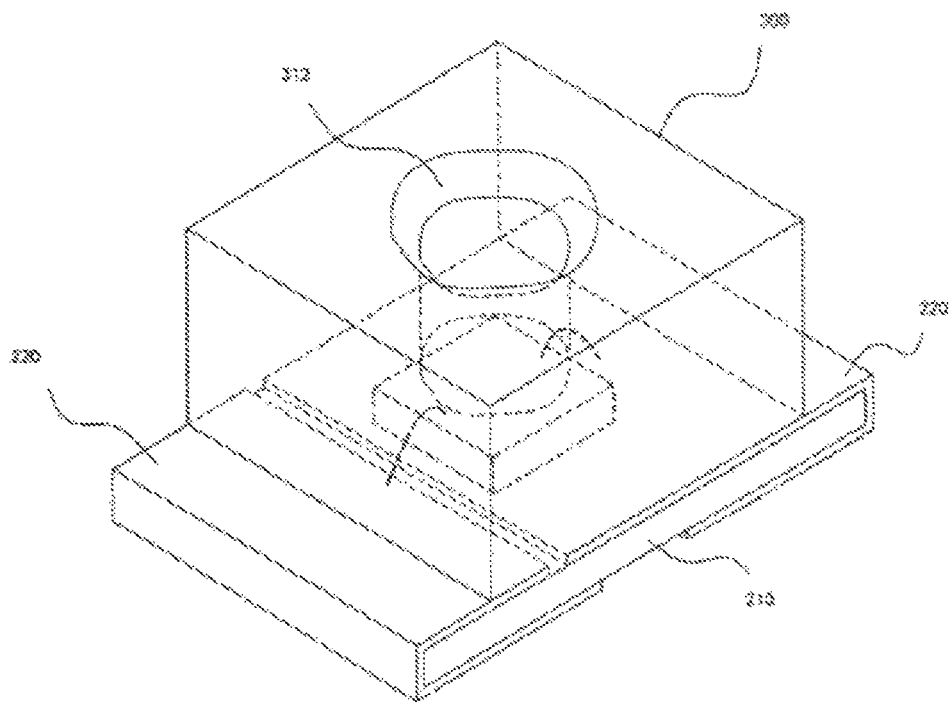
FIG. 7 is a perspective view illustrating that a tap portion 312 is additionally processed on an optical transmission member mounting portion 310 according to an embodiment of the invention.
Figure 8:
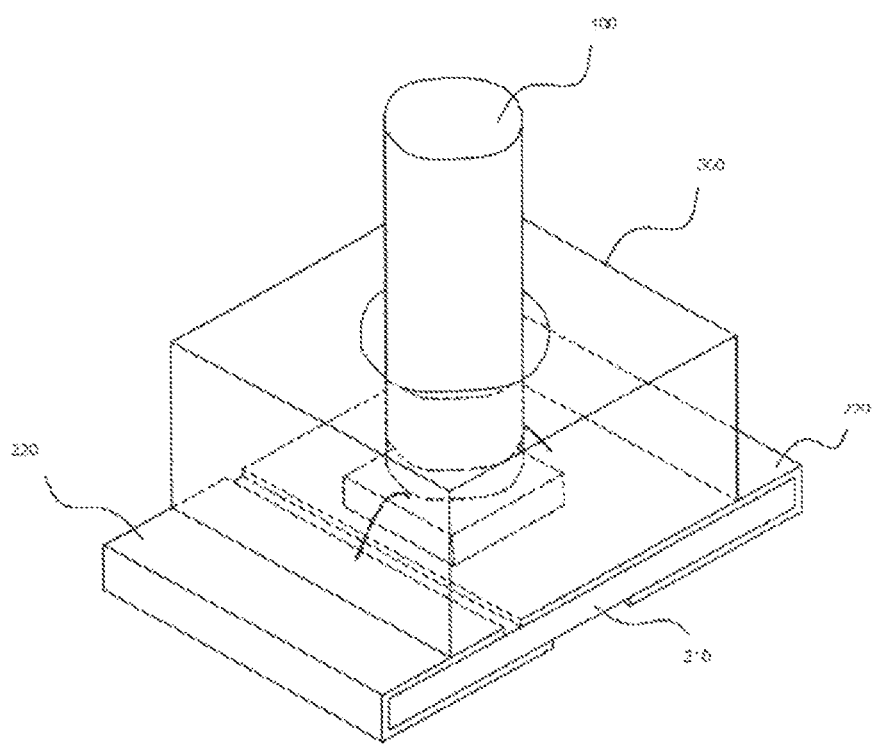
FIG. 8 is a perspective view illustrating that an optical transmission member is mounted on an optical transmission member mounting portion 310 according to an embodiment of the invention.

In addition, when a tap portion is formed on an inlet side of the optical transmission member mounting portion 310, it is possible to easily mount the optical transmission member 100, the shape of the tap portion 312 preferably has a tapered shape similarly to the case of the embodiments illustrated in FIG. 7 and FIG. 10 for the application thereof, but is not limited thereto.

It is conceivable to further form a core additional insertion portion 313 for inserting the core of the optical transmission member further deeply into the bottom face of the optical transmission member, mounting portion 310. In other words, through such configurations as illustrated in FIG. 11(j) and FIG. 11(k), the core portion of the optical transmission member 100 directly concerned in transmitting an optical signal can be closer to the optical input/output portion of the optical element, and it is possible to increase signal transmission efficiency. Since the core additional insertion portion 313 is not concerned in fixing the optical transmission member 100, it may be managed by loose fit tolerance unlike the case of width of the optical transmission member mounting 310.

When the optical transparent portion 311 or the core additional insertion portion 313 is formed, it is conceivable to apply or attach the same material 97 as the material of the optical block 300 onto the surface of the optical transparent portion or the bottom face of the core additional insertion portion. This is to compensate for roughness of a processed face to prevent optical signal transmission efficiency from being lowered by scattering of the optical signal when roughness of the surface through which the optical signal passes is high due to a limit of a processing operation in the course of processing the optical transparent portion or the core additional insertion portion or in a situation in which it is difficult to additionally perform a polishing process on the surface of the optical transparent portion or the core additional insertion portion. The reason why the material used therefor has to be the same as the material of the optical block is because, when they are different, the optical signal is refracted on an interface in an undesirable pattern due to difference in refractive index. FIG. 11 illustrates embodiments (h) and (i) of being applied to the optical transparent portion 311 and an embodiment (I) of being applied to the core additional insertion portion 313.

Next, a manufacturing method of the optical module according to the invention will be described stepwise.

First, the optical element is mounted on one face of a substrate 210. The mounting is performed by a method of applying paste or an adhesive for attachment on the surface of the optical element 220 to be attached to a mount face, and such a step may be automated using a chip bonder or a die bonder. Generally, the die bonder performs an operation of mounting at a mounting position after lifting up one face of the chip using air suction. In this case, the paste may have conductivity.

Second, the optical element 200 is electrically connected. A method of electrically connecting the mounted optical element 200 to the electrode pad 220 may be selectively any one of wire bonding, flip chip bonding, surface mounting technology (SMT), and reflow.

The wire bonding is to electrically connect the optical element to a substrate, and a thermal compression process and an ultrasound bonding manner are conceivable. The thermal compression process forms a junction portion by applying heat and pressure, melting an end of a wire with a diameter of 10 to 20 μm using electrical discharge or a torch, and applying pressure thereto, thereby forming a ball bond. As a junction condition, a junction portion is formed by applying pressure to the wire at the second junction position using a capillary tip, and the wire is cut, which is referred to as wedge bond. The junction speed is about 6 bpm (bond per minute). In the ultrasound bonding process, a wire is bonded to a pad at a normal temperature by applying pressure in a vertical direction and applying ultrasound vibration of about 60 kHz in a horizontal direction. An oxide film is destroyed by the pressure and vibration to cause metal contact, the operation is performed at the normal temperature, and thus a cold weld is formed. The junction portions at both ends of the pad have a form of ball-wedge or wedge-wedge bond. In the case of the wedge-wedge bond, a tool having a form different from that of the capillary tip can be used Au or Cu is used as a material of the wire, and a junction speed is about 240 bpm (bond per minute). The flip chip bonding is a method of mounting the optical element on a rear face of the substrate, and a process of bonding the optical element and the substrate using gold, solder bump, or the like. In addition, when the conductive paste is applied onto the rear face of the element and hot wind is blown using a reflow device, and the paste is melted to form a solder ball, which is called surface mount technology (SMT), and advantageous in low disposition and miniaturization at the time of an element packing process. In the embodiment illustrated in FIG. 4, the optical element is mounted on the substrate 210 by wire bonding, and the related electrical signal can be processed when each terminal of the optical element is individually connected to each electrode pad 220.

Third, a position on a 2-dimensional plane of an optical input/output point of the mounted optical element 200 is calculated. This is related to the fourth function of the optical block 300 which has been not described. This value is an important parameter in design for passive optical alignment, the reason is because optical alignment can be immediately secured by accurately forming the optical transmission member mounting portion 310 such that the center axis of the optical transmission member mounting portion 310 is at the calculated position on the 2-dimensional plane of the optical input/output point. When the optical transmission member 100 with a diameter of merely several hundred micrometers is used, it is substantially impossible to measure a mounting position of the optical element 200 with the naked eyes and to process the optical transmission member mounting portion 310 at the position, considering precision of the process. Therefore, in the invention, it is proposed to use a vision system configured including a camera, and such a configuration may be referred to as a so-called vision feedback process. In other words, the invention is to propose that a mounting position of the optical element 200 is predetermined, does not aim to manage to be mounted with the minimum error, mounting of the optical element 'which has been already performed' is accepted as premise, and the optical transmission member mounting portion 310 is formed just at the measured position. Accordingly, it is possible to obtain an effect of removing the operation error essentially included in the die bonder or the like, and it is possible to secure optical alignment.

Such a vision system may include an image processing device as an essential constituent element in addition to the camera. One embodiment in a method of calculating a position on a 2-dimensional plane of an optical input/output point of the optical element 200 using the vision system will be described stepwise as follows. First, a position measurement target portion of the optical element is determined according to the shape of the optical element. For example, when the cross-sectional shape in external appearance is perfectly circular, a specific point on a circumference where a distance is maximum with respect to one reference point and it is determined to measure positions of the reference point and the specific point (they form a diameter), or when the cross-sectional shape in external appearance is rectangular or square, it is possible to determine to measure positions of two points forming a diagonal of four vertices. Second, an image of the mounted optical element is taken using a camera. Third, a value of a position on a 2-dimensional plane is confirmed for each position measurement target portion determined in advance from the image. In other words, in the example, positions of two points forming a diameter on a circumference or two vertices of a rectangle are measured. The positions may be values for an absolute coordinate system of a measurement system thereof, and an absolute coordinate system value may be a relative coordinate value for a known specific reference point. The reason why it is sufficient only with the position value on the 2-dimensional plane is because the optical transmission member mounting portion 310 is formed vertically to the substrate face and thus a coordinate value in a height direction is meaningless. Fourth, the position value on the 2-dimensional plane of the optical input/output point of the optical element 200 is calculated from the position values on the 2-dimensional plane of each position measurement target portion confirmed in the previous step. This is achieved under the premise that the optical input/output point is generally positioned at the center of the optical element although optical elements have different shapes, in the example, the middle point between two points on the circumference or the middle point between two vertices forming the diagonal of the rectangle is to be the optical input/output point, and thus an average of the position coordinate values of the points is calculated to represent the average by a representing method of the coordinate system. In the embodiment, the other algorithm performing the same purpose as an example of acquiring the position value on the 2-dimensional plane of the optical input/output point is not excluded.

Figure 5:
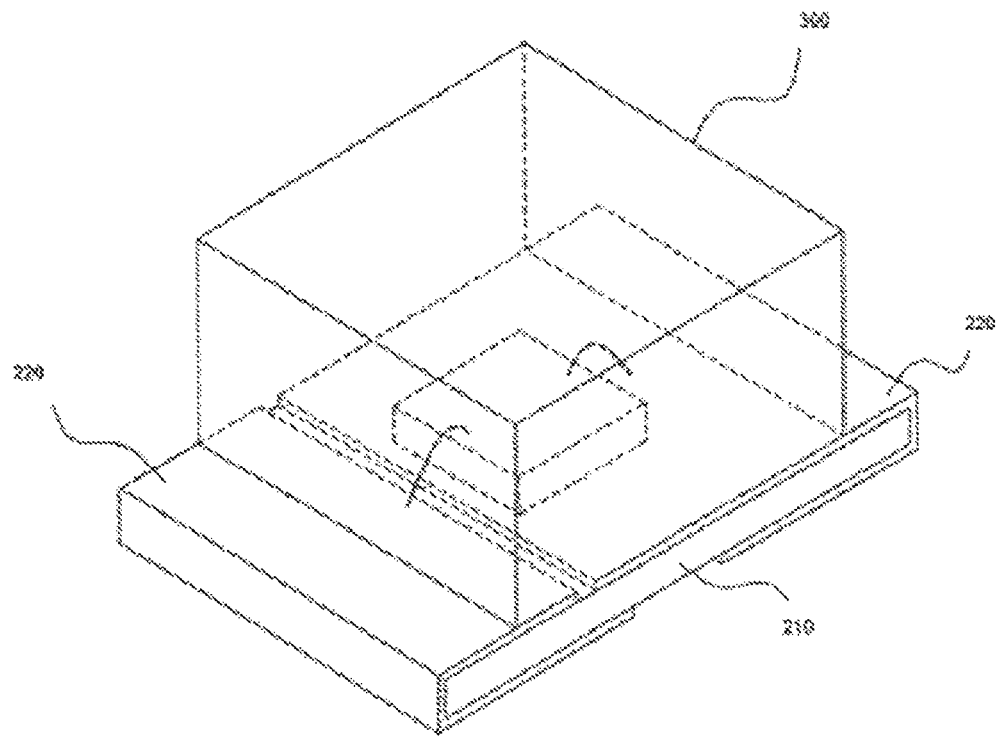
FIG. 5 is a perspective view illustrating that a base material of an optical block 300 is formed on a substrate 210 according to an embodiment of the invention.
Figure 6:
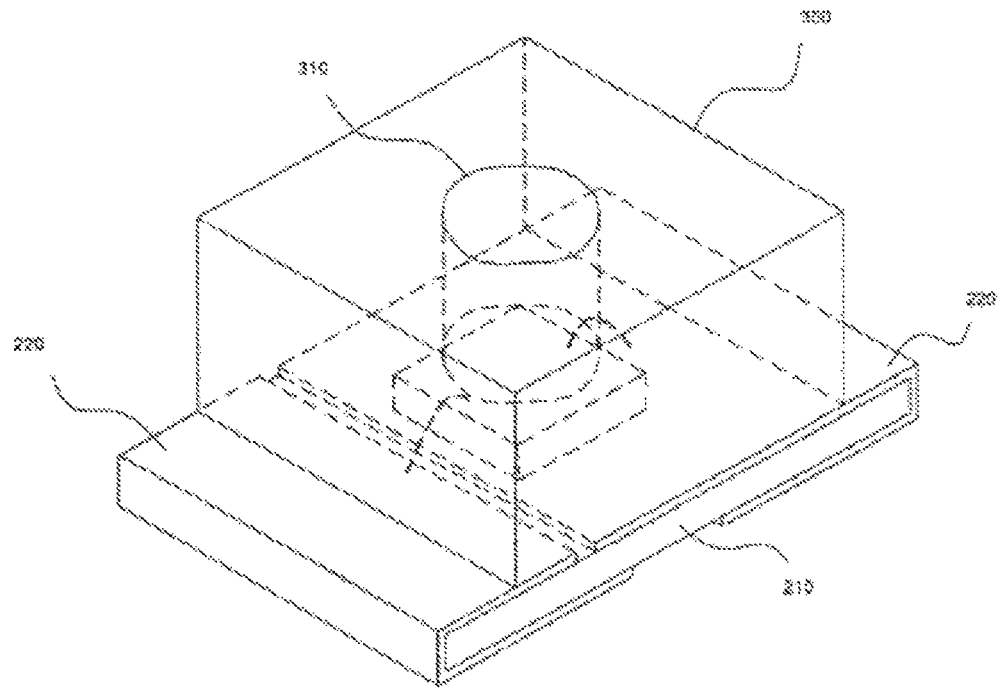
FIG. 6 is a perspective view illustrating that an optical transmission member mounting portion 310 of an optical module is formed according to an embodiment of the invention.

Fourth, a base material of the optical block 300 is formed on the substrate 210 to impregnate the optical element 200. The base material formed in such a manner can protect the optical element by impregnating the optical element, and it is important that the base material maintains strong coupling to the substrate 210 to reliably mount the optical transmission member 100. As an example of a method of forming the base material on the substrate 210 as described above, molding or injection molding directly on the substrate 210 is conceivable. In this case, it is possible to maintain strong coupling to the substrate, and basically the base material completely encapsulates the optical element. As another embodiment, there is a method in which a base material is formed in advance by molding or injection molding to have a shape of a cavity portion for accommodating the optical element at a lower portion thereof, and then such a base material is adhered or melted and attached at a predetermined position on the substrate 210. In this case, the base material does not encapsulate the optical element, merely covers the optical element at a predetermined distance by the cavity portion, and the base material may be fixed onto the substrate 210 by using a separate adhesive or by irradiating the surface of the base material with UV laser to, be partially melted and then being attached onto the substrate 210. The embodiment in which the base material is formed on the substrate 210 is illustrated in FIG. 5.

Fifth, the optical transmission member mounting portion 310 is formed on the base material at the calculated position on the 2-dimensional plane of the optical input/output point. In the embodiments illustrated in FIG. 6 to FIG. 10, the shape of the optical transmission member mounting portion 310 is cylindrical, and thus processing is performed to have a separately determined diameter of the optical transmission member mounting portion 310 by using the previously calculated position value on the 2-dimensional plane of the optical input/output point as the middle point. Such a process may be performed by a laser process, a CNC process, or drilling process. A common point of these processes is that the process is performed on the basis of the accurate position value of the operation portion, and thus they are suitable to process the optical transmission member mounting portion 310 of the invention. In the case of a mechanical drilling process, the process may be performed by a first step of generating and positioning a hole having a cylindrical shape at an accurate position, and a second step of boring to make an accurate diameter of the hole by additionally cutting the hole generated in the first step. In this case, for accurately positioning in the first step, a drilling tip has to be moved and fixed using a computer and a machine. In the case of using the CNC process, shape information of a hole is input to a computer in advance, cutting is performed on the basis of the information, and thus there is an advantage of reducing a processing time. The laser process is based on a non-contact operation, is suitable for an automation line configuration, can perform a precise control, and can embody a short processing time due to a high scan speed. Kinds of used laser are UV laser, carbon dioxide gas laser, and the like, and it may be used and selected from manners of percussion, trepanning, and helical according to boring manners. As a specific operation, a process is performed by controlling energy of one shot, the number of shots, total energy, and the like according to the thickness of the substrate 210. Even in this case, the control has to be precisely performed by a computer and a machine such that the shot starts a process, centered on the position on the 2-dimensional plane of the optical input/output point of the optical element 200 calculated above. The embodiment of the optical transmission member mounting portion 310 processed as described above is illustrated in FIG. 6, and the embodiment of additionally forming the tap portion 312 is illustrated in FIG. 7. In forming the tap portion 312, in the case of the mechanical drilling process, the process may be performed by a first step of generating a hole having a cylindrical shape at a designated position, and a second step of generating a taper inclination face by additionally cutting the hole generated in the first step. When the CNC and laser process are used, the shape information of the tapered hole is input to a computer in advance and then the process is performed.

Sixth, the optical transmission member 100 is mounted on the optical transmission member mounting portion 310 processed as described above. The mounting means fitting, and it is conceivable to add a process of fixing the optical transmission member and the optical transmission member mounting hole using an adhesive such as epoxy between them in the course of mounting to improve reliability in mounting.

In addition, when there is a bottom portion of the optical transmission member mounting portion 310, that is, the optical transparent 311 or the core additional insertion portion 313, between the processing step and the mounting step of the optical transmission member mounting portion 310, it is conceivable to apply or attach the same material as the material of the optical block 300 onto the bottom face of the core additional insertion portion. This is to prevent the optical signal transmission efficiency from decreasing due to scattering of the optical signal when roughness of the surface through which the optical signal passes is high in a situation in, which it is difficult to additionally perform a polishing process or the like on an inner face of the optical transmission member mounting portion 310 or due to a limit of precision in processing in the course of processing the optical transmission member mounting portion 310 as described above. The reason why the material used therefor has to be the same as the material of the optical block is because, when they are different, the optical signal is refracted on an interface in an undesirable pattern due to difference in refractive index. FIG. 11 illustrates embodiments (h) and (i) of being applied to the optical transparent portion 311 and an embodiment (1) of being applied to the core additional insertion portion 313.

The invention has been described with reference to the accompanying drawings, but this is merely one embodiment of various embodiments including the gist of the invention, an object thereof is to allow those skilled in the art to easily embody the invention, and it is clear that the invention is not limited to only the embodiments described above. Therefore, the protective scope of the invention should be interpreted by the following Claims, and all the technical spirits within the scope equivalent to modification, substitution, and replacement within the scope which does not deviate from the gist of the invention are included in the scope of right of the invention. In addition, some configurations of the drawings are to more clearly describe the configurations, and it is clear that they are provided by exaggeration and reduction as compared with actual.

The invention claimed is:

1. An optical module including an optical block for passive optical alignment which includes an optical element and an optical transmission member aligned on an optical axis with respect to the optical element and does not need optical alignment with respect to an external circuit, the optical module comprising:
   an optical transmission member (100) for transmitting an optical signal;
   an optical element (200) which outputs an optical signal to the optical transmission member (100) or receives an optical signal from the optical transmission member (100);
   a substrate (210) on which the optical element (200) is mounted;
   an electrode pad (220) for electrical connection between the optical element (200) and the external circuit; and
   the optical block (300) for passive optical alignment which includes an optical transmission member mounting portion formed for optical axis alignment between the optical element (200) and the optical transmission member (100),
   wherein the optical transmission member mounting portion is formed in a direction vertical to the substrate, and is formed at an optical position on the optical block where optical transmission efficiency is the maximum,
   wherein a shape of the optical transmission member mounting portion satisfies a condition of $\beta \geq \alpha$ with respect, to an aspect ratio of depth to width, where the $\alpha$ is a width of the optical transmission member mounting portion, and the $\beta$ is a depth of the optical transmission member mounting portion,
   wherein a space between the optical transmission member and the optical transmission member mounting portion is a transition fit tolerance,
   wherein an optimal position for forming the optical transmission member mounting portion is a position of an optical signal input/output point of the optical element which is obtained by taking an image of the optical element using an imaging device positioned above a mounting point of the optical element and is extracted from the image of the taken optical element, so that no additional optical alignment when mounting the optical module on the external circuit is needed,
   wherein a core additional insertion portion for inserting a core of the optical transmission member more deeply is further formed on the bottom face of the optical transmission member mounting portion.

2. The optical module according to claim 1, wherein the optical block (300) is made of a material transparent for a wavelength band of an optical signal transmitted to the optical transmission member (100).

3. The optical module according to claim 2, wherein the material transparent for the wavelength band of the optical signal transmitted to the optical transmission member (100) includes at least one of silicon, epoxy, ABS, acrylic, polyolefin, and copolymer thereof.

4. The optical module according to claim 1, wherein an optical transparent portion (311) is further formed on a bottom face of the optical transmission member mounting portion, and a shape of the optical transparent portion (311) is any one of a flat face, a convex lens having a condensing function, and a concave lens converting a dispersed optical signal into a parallel light beam (light bundle).

5. The optical module according to claim 4, wherein the shape of the optical transparent portion is a convex lens, the shape of the optical transmission member mounting portion satisfies a condition of $\beta \leq \alpha + a$ with respect to an aspect ratio of depth to width, and an insertion depth of the optical transmission member into the optical transmission member mounting portion is $\alpha$ or more, where the a is a thickness of the convex lens, the α is a width of the optical transmission member mounting portion, and the β is a depth of the optical transmission member mounting portion.

6. The optical module according to claim 4, wherein a processed face roughness of the optical transparent portion is compensated by applying or attaching the same material (97) as the material of the optical block (300) onto the surface of the optical transparent portion (311).

7. The optical module according to claim 1, wherein the optical transmission member mounting portion and, the optical transmission member (100) are coupled with a predetermined fit tolerance.

8. The optical module according to claim 1, wherein a tap portion is formed on an inlet side of the optical, transmission member mounting portion to easily mount the optical transmission member (100).

9. The optical module according to claim 1, wherein a processed face roughness of the core additional insertion portion is compensated by applying or attaching the same material (97) as the material of the optical block (300) onto the bottom face of the core additional insertion portion (311).

10. A manufacturing method of the optical module according to claim 1, comprising:

(i) a step (s10) of mounting the optical element (200) on one face of the substrate (210);
(ii) a step (s20) of electrically connecting and bonding the optical element (200);
(iii) a step (s30) of calculating a position on a 2-dimensional plane of an optical input/output point of the optical element (200);
(iv) a step (s40) of forming a base material of the optical block (300) to impregnate the optical element (200) onto the substrate (210);
(v) a step (s50) of forming the optical transmission member mounting portion at the position on the 2-dimensional plane of the optical input/output point calculated in the step of (iii) on the base material; and
(vi) a step (s60) of mounting the optical transmission member (100) on the optical transmission member mounting portion.

11. An electronic device comprising the optical module according to claim 1, wherein a signal is transmitted and received only by electrical connection between the optical module and a circuit board without additional optical axis alignment between the optical module and the circuit board.

* * * * *